United States Patent [19]

Karim et al.

[11] 4,337,298

[45] Jun. 29, 1982

[54] POLYMER COMPOSITIONS AND LAMINATES PRODUCED BY BONDING OR COEXTRUSION

[75] Inventors: Khalid A. Karim; Pallavoor R. Lakshmanan; James H. Rea, all of Houston, Tex.

[73] Assignee: Gulf Oil Corporation, Pittsburgh, Pa.

[21] Appl. No.: 291,642

[22] Filed: Aug. 5, 1981

Related U.S. Application Data

[63] Continuation-in-part of Ser. No. 208,207, Nov. 19, 1980, abandoned.

[51] Int. Cl.$^3$ .................. C08F 18/10; C09J 5/06; B32B 27/30; B29D 9/00
[52] U.S. Cl. ...................... 428/461; 156/327; 264/171; 264/DIG. 57; 428/483; 428/511; 428/514; 428/523; 428/702; 525/179; 525/221; 525/211; 524/271
[58] Field of Search ............. 525/179, 221; 260/27 R, 260/27 EV; 428/461, 483, 497, 510, 514, 523, 539, 702; 264/171, DIG. 57; 156/327

[56] References Cited

U.S. PATENT DOCUMENTS

| | | |
|---|---|---|
| 3,249,570 | 5/1966 | Potts et al. .......................... 525/221 |
| 3,264,272 | 8/1966 | Rees ...................................... 428/36 |
| 3,373,224 | 3/1968 | Mesrobian et al. .................. 525/179 |
| 3,485,785 | 12/1969 | Anspon et al. ................. 260/29.4 R |
| 3,553,178 | 1/1971 | Clampitt et al. ....................... 260/96 |
| 3,600,468 | 8/1971 | Boehme .............................. 525/221 |
| 3,970,626 | 7/1976 | Hurst et al. .................... 260/29.6 H |
| 4,078,014 | 3/1978 | Starkweather et al. ............. 525/179 |
| 4,152,387 | 5/1979 | Cloeren .............................. 425/462 |

FOREIGN PATENT DOCUMENTS

| | | | |
|---|---|---|---|
| 53-5071733 | 11/1978 | Japan ................................. 525/221 |
| 53-5090575 | | Japan ................................. 525/179 |
| 54-5108432 | 2/1979 | Japan ................................. 525/221 |
| 1183086 | 3/1970 | United Kingdom ............... 525/179 |

OTHER PUBLICATIONS

Kirk-Othmer Encyclopedia of Chemical Technology, 2nd Ed., vol. 17, pp. 475-508, (1968).

*Primary Examiner*—H. S. Cookeram
*Attorney, Agent, or Firm*—Richard L. Kelly

[57] ABSTRACT

Compatible blends of polymers are disclosed which contain (a) a low density ethylene polymer, (b) a copolymer of ethylene and an alkyl ester of acrylic or methacrylic acid or vinyl acetate, (c) an ionomer resin, and (4) optionally a tackifying resin such as a glyceryl ester of a rosin acid.

17 Claims, No Drawings

POLYMER COMPOSITIONS AND LAMINATES PRODUCED BY BONDING OR COEXTRUSION

CROSS REFERENCE TO RELATED APPLICATION

This application is a continuation in part of our earlier application Ser. No. 208,207 filed on Nov. 19, 1980 and now abandoned.

BACKGROUND OF THE INVENTION (a) Field of the Invention

The invention relates to blends of thermoplastic resins. Each blend will contain a minimum of three components and optionally a fourth component.

(b) Description of the Prior Art

While the prior art describes blends of thermoplastic resins containing two or more of the components employed in the compositions of the present invention, the prior art does not disclose the multicomponent compositions described and claimed herein.

SUMMARY OF THE INVENTION

The applicants have discovered novel blends of polymers consisting essentially of:
(a) A low density ethylene polymer,
(a) An ethylene copolymer,
(c) An ionomer resin, and
(d) Optionally a tackifying resin.

The compositions have utility principally as hot melt adhesives and as laminating resins used in the manufacture of composite film constructions by coextrusion processes.

DETAILED DESCRIPTION OF THE INVENTION

The low density ethylene polymers included in the blends will be the conventional film forming grades of ethylene polymers which have a density of less than about 0.945, preferably less than about 0.94, and more especially less than about 0.93. It is preferred to employ polymers having melt indexes* in a range of about 0.5–20, preferably about 0.5–10, and more especially about 0.5–5.0. The low density ethylene polymers can be prepared by the well known high pressure processes, or by lower pressure processes by copolymerizing ethylene with $C_3$ and higher alpha-olefins.

*As determined by ASTM 1238-70, Condition E.

The ethylene copolymers included in the blends have polymerized therein about 70 to 90, preferably about 78–83, and more especially about 80 weight % of ethylene, with the balance of the copolymer being an alkyl ester of acrylic or methacrylic acid or vinyl acetate. The alkyl group of the acrylic or methacrylic acid ester may contain from about 1 to 18 carbon atoms, with the preferred esters being the methyl and the ethyl esters. The preferred ethylene copolymers will have melt indexes* in the range of about 1–100, preferably about 2–40, and more especially about 15–25**. Such copolymers can be prepared by known methods as disclosed, for example, in U.S. Pat. No. 3,350,372. It is preferred practice to control both the alkyl acrylate or vinyl acetate content of the copolymer and the ratios of the two ethylene polymers, so that the alkyl acrylate or vinyl acetate moiety constitutes about 4–12 and preferably about 6–10 weight % of the total weight of the two ethylene polymers.

**The vinyl acetate copolymers normally will have higher melt index values than the acrylate ester copolymers.

The ionomer resin included in the blends will be a metal salt of an ethylene-acid copolymer, specifically a copolymer of ethylene and acrylic or methacrylic acid having an acid content of about 1–10 mol %. The ethylene-acid copolymer, in addition to the polymerized ethylene and acid moiety, may contain up to about 10 mol % of additional polymerized monomer moieties such as vinyl acetate, alkyl acrylates, alkyl methacrylates, acrylamide, methacrylamide, and the like. The cation employed in the salt preferably is monovalent such as alkali metal ions, e.g., sodium and potassium ions. Certain polyvalent metal ions can be employed in certain circumstances, e.g., zinc ions. In most cases, it is preferred to employ the metal cation in an amount that is less than stoichiometrically equivalent to the carboxylic acid groups of the ethylene-acid copolymer. Where the preferred quantity of the metal cation is employed, the ionomers can be viewed as being terpolymers containing polymerized ethylene, a salt of the polymerized acid, and the free polymerized acid.

The composition of the ionomer, including its molecular weight, mol % acid content, and cation content, should be adjusted so that the ionomer has a high load melt index (ASTM 1238-70, Condition F) of at least about 1.0. It's feasible to employ ionomers having a normal load melt index (ASTM 1238-70, Condition E) as high as about 50. The preferred ionomer resins will have a normal load melt index in a range of about 1 to 5. Suitable ionomers can be prepared by methods reported in the prior art. See U.S. Pat. No. 3,264,272; U.S. Pat. No. 3,485,785; and U.S. Pat. No. 3,970,626. One method consists of preparing an ethylene-acrylic (or methacrylic) acid copolymer and reacting it with sodium hydroxide to convert the desired percentage of carboxylic acid groups to sodium carboxylate groups. Another method involves saponifying an ethylene-alkyl acrylate (or methacrylate) copolymer with an aqueous sodium hydroxide solution to form a stable aqueous emulsion of the sodium salt of an ethylene-acrylic (or methacrylic) acid copolymer. Such emulsion can be coagulated with carbon dioxide as disclosed in U.S. Pat. No. 3,553,178 to recover the sodium salt in a solid form.

A tackifying resin, when included in the compositions, may be one or more resins selected from the group consisting of:
(i) Rosin,
(ii) Terpene resins having a Ring and Ball softening point of about 10°–150° C.,*
(iii) Aliphatic hydrocarbon resins having a Ring and Ball softening point of about 80°–135° C.,*
(iv) Rosin esters, and
(v) Polyamide resins having a molecular weight of about 2,000 to 12,000, having a Ring and Ball softening point of about 85°–200° C.,* and having been prepared from an aliphatic diamine and a dibasic acid containing about 36 carbon atoms and prepared by dimerizing an unsaturated aliphatic monobasic acid.

*All Ring and Ball softening points are determined by ASTM E-28-58T.

The tackifying resins employed in the invention are known products available from commercial sources. The rosin tackifiers suitable for use are those described in the KirkOthmer *Encyclopedia of Chemical Technology*, Interscience Publishers, Second Edition, Volume 17, pages 475–509. These include not only the natural occurring rosins, but the chemically modified rosins obtained by hydrogenation, dehydrogenation, isomerization, and the like.

The terpene resins employed typically will have a Ring and Ball softening point of about 10°–150° C. and preferably about 70°–120° C. Such resins generally are prepared by the polymerization of terpene hydrocarbons in the presence of Friedel-Crafts catalysts at moderately low temperatures; examples of commercially available resins of this type being the Nirez resins sold by the Reichhold Chemical Corp. and the Piccolyte S-10, S-25, S-40, S-85, S-100, S-115, S-125 and S-135 resins as sold by the Hercules Chemical Corp.

The aliphatic hydrocarbon resins employed will have a Ring and Ball softening point of about 10°–135° C. These resins are prepared by polymerization of monomers consisting primarily of 5 carbon atom olefins and diolefins; examples of commercially available resins of this type being Wing-Tack 95 as sold by the Goodyear Tire and Rubber Co. and the Sta-Tac resins sold by the Reichhold Chemical Corp.

The rosin esters employed are formed by esterifying a rosin acid with a di-, tri, or tetra-hydroxy aliphatic alcohol such as ethylene glycol, propylene glycol (either the 1,2 or the 1,3 isomer), glycerine, or pentaerythritol. The rosin acid employed will be any of the standard grades sold in commerce; the product sold under the trade designation ACINTOL R Type S being typical of acids satisfactory for use in the present invention. The typical rosin acids sold in commerce are obtained principally from tall oil and will have the following typical analysis:*

| Rosin Acids | 88–92% |
| Rosin Esters and Anhydrides | 4–6% |
| Unsaponifiable Matter | 2–6% |
| Fatty Acids | 1–3% |

*The presence of the minor components causes no difficulties in preparing the esters employed in the invention.

The rosin acids are mixtures of two principal types, the abietic types and the pimaric types. A typical distribution of individual acids found in commercial rosin acids is:

| Rosin Acid | Typical Analysis |
| --- | --- |
| Abietic Acid | 34% |
| Dehydroabietic Acid | 24% |
| Palustric Acid | 9% |
| Isopimaric Acid | 6% |
| Dihydroabietic Acid | 5% |
| Pimaric Acid | 5% |
| Neoabietic Acid | 3% |

Suitable rosin esters which are commercially available include the glyceryl ester sold under the designation Foral 85 and the pentaerythritol ester sold under the designation Foral 105.

The polyamide resins are prepared from (1) the so-called dimer acids which contain about 36 carbon atoms and which are prepared by dimerizing an unsaturated aliphatic monocarboxylic acid such as oleic or linoleic acid, and (2) a low molecular weight aliphatic diamine such as diethylene triamine or triethylene tetramine. The resins typically have a molecular weight in the range of about 2,000 to 12,000 and Ring and Ball softening points in the range of about 85° C. to about 200°. Certain of these resins are commercial products sold under the trade designations Versamid, Versalon, and Milvex.

The proportions of the components to be included in the compositions will vary somewhat depending upon the intended end use application of the composition. As earlier noted, the low density ethylene polymer and the ethylene copolymer preferably will be employed in a ratio such that the alkyl acrylate, alkyl methacrylate, or vinyl acetate moiety will constitute about 4–12, and more especially about 6–10 weight % of the total weight of the two ethylene polymers.

In the preparation of three component blends, the ionomer resin customarily will be employed in the amount of about 2–100, preferably about 5–50, and more especially about 10–40 parts per 100 parts of the two ethylene polymers. In the preparation of four component* blends, the sum of the ionomer resin and the tackifying resin concentrations customarily employed will fall within a range of about 10–200, preferably 15–100, and more especially about 20–75 parts per 100 parts of the two ethylene polymers. In most four-component compositions, it is preferred to employ the tackifying resin in a proportion somewhat higher than the ionomer resin. It is preferred not to employ the tackifying resin in excess of about 150 parts per 100 parts of the two ethylene polymers, more especially not in excess of about 100 parts per 100 parts of the two ethylene polymers, and ideally not in excess of about 75 parts per 100 parts of the two ethylene polymers.

*When two or more tackifying resins are included in a composition, the total concentration of the tackifying resins will be considered to be a single component for purposes of calculating composition percentages and ratios.

The above ranges are applicable for most end use applications presently visualized, particularly where good adhesive properties are desired. It will be recognized that optimum properties for other end use applications may vary somewhat, particularly if the ratio of the two ethylene polymers and/or the composition of the ionomer resin differs from the compositions subsequently exemplified. In addition, it will be recognized that several variables are present in the disclosed 3 and 4 component compositions, these being, inter alia, the melt index of the two ethylene polymers, and the chemical variants in the ionomer resin and the tackifying resin. For this reason, optimum properties for any combination of components will be found at different composition ranges within the ranges discussed supra. Optimum compositions for any such system can be established with a minimum of experimental work for the system of interest.

In addition to the components discussed above, the compositions of the invention may contain additional components which do not alter their functional utility for intended end use applications. For most applications, it is desirable to include an antioxidant in the compositions. Antioxidants customarily employed with ethylene polymers are suitable. Where the compositions are to be used as a hot melt adhesive, certain wax-like materials may be included to lower the compositions' melting point and/or melt viscosity. Where used, such diluents may be used in amounts of up to about 30 parts per 100 parts of the total adhesive formulation. Suitable diluents include: (1) low molecular weight, liquid polybutylenes in the range of about 600 to 3000; (2) petroleum waxes such as a paraffin wax having a melting point of about 130°–165° F., and a microcrystalline wax having a melting point of about 140°–200° F.; the latter melting points being determined by ASTM method D 127-60; (3) polyethylene waxes having a softening point of about 80°-100° C., and a hardness value, as determined by ASTM method D-1321, of about 60-120(4) mineral oil; and (5) synthetic waxes made by polymerizing carbon monoxide and hydrogen, such as Fischer-Tropsch wax.

A desirable characteristic of the compositions of the invention is that they are quite transparent and have good adhesion to a number of important materials, including wood, paper, aluminum foil, copper foil, ethylene homopolymers of both the low density and high density types, isotactic propylene polymers, ethylene-vinyl alcohol copolymers (obtained by hydrolysis of ethylene vinyl acetate copolymers) and polyethylene terephthalate polyesters. Accordingly, the compositions are well suited for use in the manufacture of laminated sheet constructions by conventional laminating techniques.

They also are well suited for use in the manufacture of composite thermoplastic film constructions by coextrusion techniques of the type shown in U.S. Pat. No. 4,152,387. They also can be employed as hot melt adhesives to form strong bonds between surfaces of the type noted supra.

In the manufacture of composite film constructions by coextrusion techniques, it is usually preferred to employ the three component compositions. This preference is based upon the consideration that such compositions have excellent resistance to a number of solvents, including particularly natural fats, and good vapor barrier properties. The adhesion of such compositions to the principal thermoplastic resins of commercial interest (as measured by peel strength discussed infra) is adequate for most purposes.

In applications where very high adhesion is required, it is preferred to employ four component compositions containing a tackifying resin of the type discussed supra. The proper formulations to obtain an optimum balance of properties can be established by reference to the experimental data set forth infra.

In addition to their favorable physical properties, the compositions of the invention have a favorable combination of electrical properties measured by dissipation factor, dielectric constant and dielectric strength. Accordingly, they can be used as an adhesive to bond polyethylene terephthalate film to copper foil to prepare articles useful in the electronics industry.

The following examples are set forth to illustrate more clearly the principle and practice of the invention to those skilled in the art. Where parts or percentages are mentioned, they are parts or percentages on a weight basis unless otherwise noted. The polymeric materials employed in the examples are described below.

The ethylene homopolymer employed was a commercially available low density film grade ethylene homopolymer having a density of about 0.924 and a melt index of about 0.8.

Ethylene copolymer A was a commercially available ethylene-methyl acrylate copolymer which contained 20 weight % of methyl acrylate and had a melt index of about 2.4.

Ethylene copolymer B was an ethylene-ethyl acrylate copolymer containing about 18 weight % ethyl acrylate and having a melt index of about 6.

Ionomer resin A was a commercial product sold under the designation Surlyn 1601. This product is reported by the manufacturer to be a sodium salt of an ethylene-methacrylic acid copolymer having a melt index of about 1.3.

Ionomer resin B was a commercial product sold under the designation Surlyn 1605. This product is reported by the manufacturer to be a sodium salt of an ethylene-methacrylic acid copolymer having a melt index of about 2.8.

Ionomer resin C was a commercial product sold under the designation Surlyn 1652. This product is reported by the manufacturer to be a zinc salt of an ethylene-methacrylic acid copolymer having a melt index of about 5.0.

Tackifying resin A was a commercial product sold under the designation Piccolyte S-70. This product is reported by the manufacturer to be a terpene polymer prepared from beta-pinene having a softening point of about 70° C.

Tackifying resin B was a commercial product sold under the designation Escorez 5300. This product is reported by the manufacturer to be an aliphatic hydrocarbon resin having a softening point of about 105° C.

Tackifying resin C was a commercial product sold under the designation Adtac B-10. This product is reported by the manufacturer to be an aliphatic hydrocarbon resin having a softening point of about 10° C.

Tackifying resin D was a commercial product sold under the designation Foral 85. This product is reported by the manufacturer to be a glycerine ester of highly hydrogenated rosin acids and has a melting point of about 80° C.

Tackifying resin E was a commercial product sold under the designation Zonatac 105. This product is reported by the manufacturer to be a terpene resin having a melting point of about 105° C.

Tackifying resin F was a commercial product sold under the designation Sta-tac 100. This product is reported by the manufacturer to be an aliphatic hydrocarbon resin having a softening point of about 100° C.

Tackifying resin G was a commercial product sold under the designation Foral AX. This product is reported by the manufacturer to be a highly hydrogenated rosin having a softening point of about 75° C.

Tackifying resin H was a commercial product sold under the designation Foral 105. This product is reported by the manufacturer to be a pentaerythritol ester of highly hydrogenated rosin acids and has a melting point of about 105° C.

EXAMPLE 1

A series of three component blends were prepared from the ethylene homopolymer, the two ethylene copolymers and Ionomer Resins A and B described supra. The blends were prepared by fluxing the blends for 20 minutes in a Barbender Plasticorder operated at approximately 130° C. and 40 rpm. The blends subsequently were ground to a particle size that passed through an 8 mesh screen.

The adhesion of the blends to polyethylene terephthalate film* was measured. The powdered blend was distributed over a section of one sheet of the polyester film (5 mil thick) and a second sheet of polyester film was laid on the assembly. The assembly then was pressed for 10 minutes at 300° F. under an applied pressure of 2500 lbs/in$^2$. Specimens 1" wide were cut through both the bonded and the unbonded (adhesive free area) sections of the laminate. The peel strength of the laminated section was measured by pulling the laminate apart in an Instrom machine operated at a cross head speed of 2"/minute. The compositions tested and their peel strength in lbs/inch are shown in Table I.
*Sold under the designation Mylar.

TABLE I

| Composition | Control 1-A | Control 1-B | Control 1-C | Control 1-D |
|---|---|---|---|---|
| Component | | | | |
| Ethylene Homopolymer | 70 | 100 | — | — |
| Ethylene Copolymer A | 30 | — | 100 | 5 |
| Ethylene Copolymer B | — | — | — | — |
| Ionomer Resin A | — | 5 | 100 | 100 |
| Ionomer Resin B | — | — | — | — |
| Peel Strength (lbs/inch) | | | | |
| Mylar/Mylar | 0.1 | 0.1 | 0.1 | 0.1 |

| Composition | 1-1 | 1-2 | 1-3 | 1-4 |
|---|---|---|---|---|
| Component | | | | |
| Ethylene Homopolymer | 70 | 70 | 70 | 70 |
| Ethylene Copolymer A | 30 | 30 | 30 | 30 |
| Ethylene Copolymer B | — | — | — | — |
| Ionomer Resin A | 2 | 5 | 11 | 25 |
| Ionomer Resin B | — | — | — | — |
| Peel Strength (lbs/inch) | | | | |
| Mylar/Mylar | 0.3 | 0.6 | 1.3 | 0.8 |

| Composition | 1-5 | 1-6 | 1-7 | 1-8 |
|---|---|---|---|---|
| Component | | | | |
| Ethylene Homopolymer | 70 | 50 | 50 | 50 |
| Ethylene Copolymer A | — | 50 | 50 | 50 |
| Ethylene Copolymer B | 30 | — | — | — |
| Ionomer Resin A | — | 5 | 11 | 25 |
| Ionomer Resin B | 5 | — | — | — |
| Peel Strength (lbs/inch) | | | | |
| Mylar/Mylar | 0.6 | 0.5 | 0.9 | 3.3 |

| Composition | | 1-9 | 1-10 | 1-11 |
|---|---|---|---|---|
| Component | | | | |
| Ethylene Homopolymer | | 50 | 50 | 50 |
| Ethylene Copolymer A | | 50 | 50 | 50 |
| Ethylene Copolymer B | | — | — | — |
| Ionomer Resin A | | 52 | 67 | 100 |
| Ionomer Resin B | | — | — | — |
| Peel Strength (lbs/inch) | | | | |
| Mylar/Mylar | | 0.8 | 0.3 | 0.3 |

Referring to Controls 1-A, 1-B, 1-C and 1-D, it is noted that (1) binary blends of the two ethylene polymers, and (2) binary blends of the ionomer resin with either of the ethylene polymers do not provide significant adhesion between the polyester films. The adhesion data for Compositions 1-1, 1-2, 1-3 and 1-4 show how adhesion values very as the concentration of Ionomer Resin A is varied with a fixed ratio of the Ethylene Homopolymer and Ethylene Copolymer A. The adhesion data for Compositions 1-6, 1-7, 1-8, 1-9, 1-10 and 1-11 vary as the concentration of Ionomer Resin A is varied with a different fixed ratio of the Ethylene Homopolymer and Ethylene Copolymer A. The data for Compositions 1-2 and 1-5 suggest that Ethylene Copolymers A and B can be used interchangeably in the compositions without significantly affecting the peel strength values. The same data also suggest that Ionomer Resins A and B can be used interchangeably without significantly affecting the peel strength values. Other data not shown in the table suggest that ionomer resins containing zinc ions such as Ionomer Resin C described supra can be employed in lieu of Ionomer Resins A and B to provide compositions having properties similar to those shown in Table I.

EXAMPLE 2

Employing the same techniques described in Example 1, a series of four-component blends were prepared employing Tackifying Resins A-H described supra. The adhesion values in bonding two sheets of polyethylene terephthalate film together were measured as described in Example 1. The compositions tested and their peel strengths are shown in Table II.

TABLE II

| Composition | Control 2-A | Control 2-B | Control 2-C | Control 2-D | Control 2-E |
|---|---|---|---|---|---|
| Component | | | | | |
| Ethylene Homopolymer | 70 | 70 | 70 | 70 | — |
| Ethylene Copolymer A | 30 | 30 | 30 | 30 | 100 |
| Ethylene Copolymer B | — | — | — | — | — |
| Ionomer Resin A | — | — | — | — | — |
| Ionomer Resin B | — | — | — | — | — |
| Tackifying Resin A | 5 | 11 | 18 | 25 | 25 |
| Tackifying Resin B | — | — | — | — | — |
| Tackifying Resin C | — | — | — | — | — |
| Tackifying Resin D | — | — | — | — | — |
| Tackifying Resin E | — | — | — | — | — |
| Tackifying Resin F | — | — | — | — | — |
| Tackifying Resin G | — | — | — | — | — |
| Tackifying Resin H | — | — | — | — | — |
| Peel Strength (lbs/inch) | | | | | |
| Mylar/Mylar | 0.2 | 0.4 | 0.6 | 0.4 | 0.2 |

| Composition | Control 2-F | Control 2-G | Control 2-H |
|---|---|---|---|
| Component | | | |
| Ethylene Homopolymer | — | — | 50 |
| Ethylene Copolymer A | 100 | — | — |
| Ethylene Copolymer B | — | — | — |
| Ionomer Resin A | — | 100 | 50 |
| Ionomer Resin B | — | — | — |
| Tackifying Resin A | — | 25 | 25 |
| Tackifying Resin B | 25 | — | — |
| Tackifying Resin C | — | — | — |
| Tackifying Resin D | — | — | — |
| Tackifying Resin E | — | — | — |
| Tackifying Resin F | — | — | — |
| Tackifying Resin G | — | — | — |
| Tackifying Resin H | — | — | — |
| Peel Strength (lbs/inch) | | | |
| Mylar/Mylar | 0.4 | 0.1 | 0.1 |

| Composition | 2-1 | 2-2 | 2-3 | 2-4 | 2-5 |
|---|---|---|---|---|---|
| Component | | | | | |
| Ethylene Homopolymer | 70 | 70 | 70 | 70 | 70 |
| Ethylene Copolymer A | 30 | 30 | 30 | 30 | 30 |
| Ethylene Copolymer B | — | — | — | — | — |
| Ionomer Resin A | — | 31 | — | 15 | — |
| Ionomer Resin B | 13 | — | 31 | — | 13 |
| Tackifying Resin A | 20 | 20 | 20 | 39 | — |
| Tackifying Resin B | — | — | — | — | 20 |
| Tackifying Resin C | — | — | — | — | — |
| Tackifying Resin D | — | — | — | — | — |
| Tackifying Resin E | — | — | — | — | — |
| Tackifying Resin F | — | — | — | — | — |
| Tackifying Resin G | — | — | — | — | — |
| Tackifying Resin H | — | — | — | — | — |
| Peel Strength (lbs/inch) | | | | | |
| Mylar/Mylar | 3.0 | 2.0 | 2.4 | 3.9 | 2.3 |

| Composition | 2-6 | 2-7 | 2-8 | 2-9 | 2-10 |
|---|---|---|---|---|---|
| Component | | | | | |
| Ethylene Homopolymer | 70 | 70 | 70 | 70 | 70 |
| Ethylene Copolymer A | 30 | 30 | 30 | 30 | 30 |
| Ethylene Copolymer B | — | — | — | — | — |
| Ionomer Resin A | 15 | 15 | 15 | 15 | 15 |
| Ionomer Resin B | — | — | — | — | — |
| Tackifying Resin A | — | — | — | — | — |
| Tackifying Resin B | — | 39 | — | — | — |
| Tackifying Resin C | 39 | — | — | — | — |
| Tackifying Resin D | — | — | 39 | — | — |
| Tackifying Resin E | — | — | — | 39 | — |
| Tackifying Resin F | — | — | — | — | 39 |
| Tackifying Resin G | — | — | — | — | — |
| Tackifying Resin H | — | — | — | — | — |
| Peel Strength (lbs/inch) | | | | | |
| Mylar/Mylar | 2.4 | 2.8 | 6.0 | 3.3 | 2.9 |

TABLE II-continued

| Composition | 2-11 | 2-12 | 2-14 | | |
|---|---|---|---|---|---|
| Component | | | | | |
| Ethylene Homopolymer | 70 | 70 | 70 | | |
| Ethylene Copolymer A | 30 | 30 | 30 | | |
| Ethylene Copolymer B | — | — | — | | |
| Ionomer Resin A | 13 | 15 | 16 | | |
| Ionomer Resin B | — | — | — | | |
| Tackifying Resin A | — | — | — | | |
| Tackifying Resin B | — | — | — | | |
| Tackifying Resin C | — | — | — | | |
| Tackifying Resin D | — | — | — | | |
| Tackifying Resin E | — | — | — | | |
| Tackifying Resin F | — | — | — | | |
| Tackifying Resin G | 39 | 13 | — | | |
| Tackifying Resin H | — | — | 39 | | |
| Peel Strength (lbs/inch) | | | | | |
| Mylar/Mylar | 6.6 | 4.1 | 2.0 | | |

| Composition | 2-15 | 2-16 | 2-17 | 2-18 | 2-19 |
|---|---|---|---|---|---|
| Component | | | | | |
| Ethylene Homopolymer | 70 | 70 | 70 | 70 | 70 |
| Ethylene Copolymer A | 30 | 30 | 30 | 30 | 30 |
| Ethylene Copolymer B | — | — | — | — | — |
| Ionomer Resin A | 15 | 15 | 16 | 17 | 19 |
| Ionomer Resin B | — | — | — | — | — |
| Tackifying Resin A | — | — | — | — | — |
| Tackifying Resin B | — | — | — | — | — |
| Tackifying Resin C | — | — | — | — | — |
| Tackifying Resin D | 13 | 20 | 63 | 97 | 147 |
| Tackifying Resin E | — | — | — | — | — |
| Tackifying Resin F | — | — | — | — | — |
| Tackifying Resin G | — | — | — | — | — |
| Tackifying Resin H | — | — | — | — | — |
| Peel Strength (lbs/inch) | | | | | |
| Mylar/Mylar | 1.2 | 2.5 | 5.0 | 1.0 | 0.5 |

| Composition | 2-20 | 2-21 | 2-22 | 2-23 | |
|---|---|---|---|---|---|
| Component | | | | | |
| Ethylene Homopolymer | 70 | 70 | 70 | 70 | |
| Ethylene Copolymer A | 30 | 30 | 30 | 30 | |
| Ethylene Copolymer B | — | — | — | — | |
| Ionomer Resin A | 15 | 16 | 17 | 19 | |
| Ionomer Resin B | — | — | — | — | |
| Tackifying Resin A | — | — | — | — | |
| Tackifying Resin B | — | — | — | — | |
| Tackifying Resin C | — | — | — | — | |
| Tackifying Resin D | — | — | — | — | |
| Tackifying Resin E | 34 | 63 | 97 | 147 | |
| Tackifying Resin F | — | — | — | — | |
| Tackifying Resin G | — | — | — | — | |
| Tackifying Resin H | — | — | — | — | |
| Peel Strength (lbs/inch) | | | | | |
| Mylar/Mylar | 1.4 | 0.4 | 0.5 | 0.1 | |

| Composition | 2-24 | 2-25 | 2-26 | 2-27 | |
|---|---|---|---|---|---|
| Component | | | | | |
| Ethylene Homopolymer | 70 | 70 | 70 | 50 | |
| Ethylene Copolymer A | 30 | 30 | 30 | 50 | |
| Ethylene Copolymer B | — | — | — | — | |
| Ionomer Resin A | 31 | 102 | 15 | 15 | |
| Ionomer Resin B | — | — | — | — | |
| Tackifying Resin A | 23 | 204 | — | — | |
| Tackifying Resin B | — | — | — | — | |
| Tackifying Resin C | — | — | — | — | |
| Tackifying Resin D | — | — | — | 39 | |
| Tackifying Resin E | — | — | — | — | |
| Tackifying Resin F | — | — | 20 | — | |
| Tackifying Resin G | — | — | — | — | |
| Tackifying Resin H | — | — | — | — | |
| Peel Strength (lbs/inch) | | | | | |
| Mylar/Mylar | 2.4 | 0.4 | 1.2 | 3.6 | |

The data for Controls 2-A, 2-B, 2-C, and 2-D indicate that blends of the two ethylene polymers with several concentrations of a tackifying resin do not provide significant adhesion between the polyester films. The data for Controls 2-E and 2-F indicate that blends of a tackifying resin with an ethylene copolymer provide little adhesion between the polyester films. The data for Control 2-G indicate that blending a tackifying resin with an ionomer resin does not provide significant adhesion between the polyester films. The data for Control 2-H indicate that a ternary blend of an ethylene homopolymer, an ionomer resin, and a tackifying resin does not provide significant adhesion between polyester films.

The data for Compositions 2-1, 2-2, 2-3, and 2-4 indicate that several combinations of Ionomer Resin A and Ionomer Resin B with Tackifying Resin A provide good adhesion between polyester films, when these two components are blended with the Ethylene Homopolymer and Ethylene Copolymer A. Composition 2-24 is another composition based on these same components which has good peel strength. Composition 2-25 contains the same components, but in concentrations which fall outside the operable range of the invention. The peel strength value is poor.

The data for Compositions 2-15 through 2-19 show how variations in adhesion are obtained by varying the concentration of Tackifying Resin D, while holding the concentrations of the Ethylene Homopolymer, Ethylene Copolymer A, and Ionomer Resin A essentially constant. The data for Compositions 2-20 through 2-23 show the variations in peel strength obtained by varying the concentration of Tackifying Resin E, while holding the composition of the Ethylene Homopolymer, Ethylene Copolymer A, and Ionomer Resin A essentially constant.

The above data indicate that the optimum peel values that can be obtained will vary somewhat depending upon the particular tackifying resin employed in the compositions. In addition, the peel values obtained with certain tackifying resins are significantly more sensitive to concentration effects than is the case with other tackifying resins. The compositions having peel values of less than 1.0 lb/inch are shown primarily to illustrate the concentration effects, rather than being representative of preferred embodiments of the invention.

Compositions 2-5 through 2-14, 2-24, 2-26 and 2-27 show additional typical formulations of compositions falling within the invention. All of these compositions provide good adhesion between polyester films.

Compositions having similar properties are obtained when several commercially available ethylene-vinyl acetate copolymers are substituted for ethylene-methyl acrylate copolymers in certain of the compositions shown in Table II.

EXAMPLE 3

The adhesion of compositions 1-8, 2-8, 2-9, and 2-10 shown in Tables I and II in bonding two sheets of polyethylene terephthalate film, high density polyethylene (density=0.96) film, aluminum foil and ethylene-vinyl alcohol copolymer film were determined and are shown in Table III.

TABLE III

| Composition | Laminae Pair | Peel Strength lbs/inch |
|---|---|---|
| 1-8 | Polyester/Polyester | 3.3 |
| " | HDPE/HDPE | 1.0 |
| " | Al. Foil/Al. Foil | 2.5 |
| " | EVAL/EVAL | >2.0* |
| 2-8 | Polyester/Polyester | 6.0 |
| " | HDPE/HDPE | 2.0 |
| " | Al. Foil/Al. Foil | 3.3 |
| " | EVAL/EVAL | >2.0* |
| 2-9 | Polyester/Polyester | 3.3 |

TABLE III-continued

| Composition | Laminae Pair | Peel Strength lbs/inch |
|---|---|---|
| " | HDPE/HDPE | 3.6 |
| " | EVAL/EVAL | >2.0* |
| 2-10 | Polyester/Polyester | 2.9 |
| " | HDPE/HDPE | 2.1 |
| " | Al. Foil/Al. Foil | 3.0 |
| " | EVAL/EVAL | >2.0* |

*Substrate failure

Certain physical and electrical properties of compositions 1-8, 2-8, 2-9, and 2-10 shown in Tables I and II were determined by standard ASTM methods. These properties are shown in Table IV.

TABLE IV

| Property | Composition | | | |
|---|---|---|---|---|
| | 2-8 | 2-9 | 1-8 | 2-10 |
| % Elongation at Break | 450 | 469 | 377 | 493 |
| Ultimate Tensile (K psi) | 1.6 | 1.6 | 1.6 | 1.6 |
| Tensile at Yield (K psi) | 1.1 | 1.3 | 1.2 | 1.2 |
| Melt Index at 190° C., g/10 min | 10.1 | 6.4 | 1.5 | 9.1 |
| Dissipation Factor at 1000 KC | 0.0047 | 0.0033 | 0.0067 | 0.0034 |
| At 100 KC | 0.0102 | 0.0024 | 0.0033 | 0.0032 |
| Dielectric Constant at 100 KC | 2.47 | 2.33 | 2.39 | 2.32 |
| At 100 KC | 2.39 | 2.29 | 2.42 | 2.28 |
| Dielectric Strength, volts | 664 | 686 | 716 | 773 |

In the above discussions, reference was made to several publications and patents for descriptions of certain components employed in the compositions of the invention, test methods employed and the like. The descriptions of the publications and patents are incorporated herein by reference.

What is claimed:

1. A compatible blend of polymers consisting essentially of:
   (a) A low density ethylene polymer,
   (b) An ethylene copolymer,
   (c) An ionomer resin, and
   (d) Optionally a tackifying resin;
   said low density ethylene polymer having a density of less than about 0.945 and a normal load melt index of about 0.5-20; said ethylene copolymer having polymerized therein about 70 to 90 weight % of ethylene and the balance an alkyl ester of acrylic or methacrylic acid or vinyl acetate; said two ethylene polymers being present in proportions such that the alkyl ester or vinyl acetate moiety of the ethylene copolymer constitutes about 4-12 weight % of the total weight of the two ethylene polymers; said ionomer resin being a metal salt of an ethylene-acid copolymer which is a copolymer of ethylene and acrylic or methacrylic acid having an acid content of about 1-10 mol % and having a high load melt index of at least about 1.0 and a normal load melt index of up to about 50; said tackifying resin being selected from the group consisting of:
   (i) Rosin,
   (ii) Terpene resins having a Ring and Ball softening point of about 10°-150° C.,
   (iii) Aliphatic hydrocarbon resins having a Ring and Ball softening point of about 10°-135° C.,
   (iv) Esters formed between a rosin acid and a di-, tri-, or tetrahydroxy aliphatic alcohol, and
   (v) Polyamide resins having a molecular weight of about 2,000 to 12,000, having a Ring and Ball softening point of about 85°-200° C., and having been prepared from an aliphatic diamine and a dibasic acid containing about 36 carbon atoms and prepared by dimerizing an unsaturated aliphatic monobasic acid;
   said composition containing 100 parts by weight of the two ethylene polymers, about 2-100 parts by weight of the ionomer resin, and from zero to about 150 parts by weight of the tackifying resin.

2. A composition of claim 1 which contains no tackifying resin.

3. A composition of claim 2 which contains about 5-50 parts by weight of the ionomer resin.

4. A composition of claim 1 which contains a tackifying resin.

5. A composition of claim 4 in which the tackifying resin is present in an amount greater than the ionomer resin and is present in an amount not in excess of about 75 parts per weight per 100 parts of the two ethylene polymers.

6. A composition of claim 1, 2, 3, 4, or 5 in which the ethylene copolymer is a copolymer of ethylene and methyl acrylate.

7. A composition of claim 1, 2, 3, 4, or 5 in which the ethylene copolymer is a copolymer of ethylene and ethyl acrylate.

8. A composition of claim 1, 2, 3, 4, or 5 in which the ethylene copolymer is a copolymer of ethylene and vinyl acetate.

9. A composition of claim 1, 2, 3, 4, or 5 in which the ionomer resin is a partial alkali metal salt of the ethylene-acid copolymer.

10. A composition of claim 1, 4, or 5 in which the tackifying resin is a rosin ester formed from a rosin acid and ethylene glycol, propylene glycol, glycerine, or a tetrahydroxy aliphatic alcohol.

11. A composition of 1, 4, or 5 in which the tackifying resin is a rosin ester formed between a rosin acid and glycerine.

12. A composition of claim 1, 4, or 5 in which the tackifying resin is a rosin ester formed between a rosin acid and pentaerythritol.

13. A composition of claim 1, 4, or 5 in which the tackifying resin is a terpene resin having a Ring and Ball softening point of about 70°-120° C.

14. A composition of claim 1, 4, or 5 in which the tackifying resin is an aliphatic hydrocarbon resin having a softening temperature of about 10°-135° C.

15. A laminated sheet construction containing first and third laminae intimately fusion-bonded to a second lamina; each of said first and third laminae sheets being independently fabricated from paper, aluminum, copper, an ethylene homopolymer, an ethylene-vinyl alcohol copolymer, an isotactic propylene polymer or a polyethylene terephthalate polyester; and said second lamina being fabricated from a polymer composition of claim 1.

16. In an adhesive method for bonding together two articles having surfaces of paper, aluminum, copper, an ethylene homopolymer, an ethylene-vinyl alcohol copolymer, an isotactic propylene polymer or a polyethylene terephthalate polyester in which a hot melt adhesive heated above its melting point is placed between the surfaces to be bonded together, said surfaces are assembled together and the assembly is cooled to ambient temperature to solidify such adhesive; the improvement which consists essentially of employing as the hot melt adhesive a polymer composition of claim 1.

17. In a coextrusion process for preparing a composite polymer film construction having polymers in the two surface layers which are fusion-bonded to each other by an intermediate polymer layer in which three polymer streams are fed into three channels of a film die, and the three polymer streams flow into the film die and are extruded to form an extrudate in which the three polymer streams form a film having three fusion-bonded layers, the improvement which consists of employing an ethylene homopolymer, an ethylene-vinyl alcohol copolymer, an isotactic propylene polymer, or a polyethylene terephthalate polyester as the polymer to form each of the two surface layers and employing a polymer composition of claim 1 to form the intermediate polymer layer.

* * * * *